United States Patent [19]

Crivello

[11] Patent Number: 5,350,604

[45] Date of Patent: Sep. 27, 1994

[54] PHOTOCURABLE COMPOSITIONS OF POLYINDANE AND 1,3-DIISOPROPENYLBENZENE, AND COATING PROCESS

[75] Inventor: James V. Crivello, Clifton Park, N.Y.

[73] Assignee: Rensselaer Polytechnic Institute, Troy, N.Y.

[21] Appl. No.: 988,218

[22] Filed: Dec. 9, 1992

[51] Int. Cl.$^5$ .................. B05D 1/26; B05D 3/12; C08F 12/34

[52] U.S. Cl. .................. 427/512; 522/31; 522/125; 526/336; 525/289; 427/520; 427/240; 430/288

[58] Field of Search .................. 526/336; 522/125; 427/512, 517, 520; 430/281, 288

[56] References Cited

U.S. PATENT DOCUMENTS

| | | | |
|---|---|---|---|
| 4,205,160 | 5/1980 | Gloth | 526/336 |
| 4,499,248 | 2/1985 | Jalics | 526/336 |
| 4,882,201 | 11/1989 | Crivello et al. | 427/54.1 |
| 5,049,615 | 9/1991 | Chu | 525/92 |
| 5,079,378 | 1/1992 | Crivello | 556/64 |

FOREIGN PATENT DOCUMENTS

0449453A2 10/1991 European Pat. Off.

OTHER PUBLICATIONS

Chemical Abstracts; vol. 102, No. 8, p. 9, Abstract No. 62691j (Mitsui) for JP59-145,207.

"Polymers from diisopropenylbenzene," H. A. Colvin and J. Muse, Chemtech, Aug. 1986, pp. 500–504.

"Anionic Polymerization and Copolymerization of 1,3- and 1,4-Diisopropenylbenzene," P. Lutz, G. Beinert, and P. Remmp, Makromol. Chem. 183 (1982), pp. 2787–2797.

"New Catalysts for the Polymerization of Diisopropenylbenzenes," A. A. D'Onofrio, Journal of Applied Polymer Science, vol. 8, (1964), pp. 521–526.

"The Preparation and Structure of Linear Polymers from Diisopropenylbenzenes," by H. Brunner, A. L. L. Palluel and D. J. Walbridge as printed in the "Letters to the Editors" section of the Journal of Polymer Science, vol. XXVIII, Issue No. 118 (1958), pp. 620–631.

"The Reactivity of Aromatic Dialkenyl Compounds in Polymerisation Reactions," by R. M. Nasirova, L. S. Murav'eva, and B. A. Krentsel', Russian Chemical Reviews, 48(7), (1979), pp. 692–698.

"New Synthesis of Aryl-Substituted Sulfonium Salts and Their Applications in Photoinitiated Cationic Polymerization," by S. R. Akhtar, J. V. Crivello, J. L. Lee, and M. L. Schmitt; Chem. Mater., vol. 2, No. 6 (1990), pp. 732–737.

"Cationic polymerization of bis(1-alkylvinyl)benzenes and related monomers, 3$^a$) Telechelics containing indane units," by O. Nuyken, D. Yang, F. Gruber and G. Maier; Makromol. Chem. 192 (1991), pp. 1969–1979.

"Synthesis and Characterization of Bis(isopropenylphenoxy)alkanes and Bis(Vinylphenoxy)alkanes: Two Classes of Highly Reactive, Photopolymerizable Monomers," by J. V. Crivello and A. Ramdas; J. M. S.-Pure Appl. Chem., A29(9), (1992), pp. 753–774.

*Primary Examiner*—Marion E. McCamish
*Assistant Examiner*—Arthur H. Koeckert
*Attorney, Agent, or Firm*—Heslin & Rothenberg

[57] ABSTRACT

A process for cationically polymerizing 1,3-diisopropenylbenzene to produce a polymer which is predominantly a polyindane is disclosed. The resulting polyindanes are novel compounds useful as low dielectric constant coatings. Compositions containing 1,3-diisopropenylbenzene and cationic photoinitiators, and optionally containing a polyindane useful for preparing coatings, are disclosed as are processes for coating substrates using the compositions.

7 Claims, No Drawings

PHOTOCURABLE COMPOSITIONS OF POLYINDANE AND 1,3-DIISOPROPENYLBENZENE, AND COATING PROCESS

BACKGROUND OF THE INVENTION

1. Field of the Invention

The invention relates to a process for polymerizing 1,3-diisopropenylbenzene, to polyindanes resulting from the process, to compositions for preparing low dielectric constant coatings, comprising polyindanes in admixture with 1,3-diisopropenylbenzene and to processes for coating substrate with the low dielectric coatings.

2. Information Disclosure

Low dielectric constant insulators are critical components in on-chip interconnect and first lever package integrated circuit applications. Such materials fulfill several functions. First, they provide electrical and electronic isolation of one discrete chip component from another and permit high component densities by eliminating crosstalk between the discrete components. Second, they function to planarize the topography of a chip during many fabrication steps. Lastly, they act as barriers to contaminants and corrosive agents and to low energy α-particle penetration. Because of their importance, much research has been directed towards the development of novel low dielectric constant insulators in general and to organic dielectric materials in particular. The focus on organic dielectrics has derived mainly from the ability of these materials to be easily prepared and applied using solution or vapor deposition techniques. Besides having a low dielectric constant, an organic dielectric must also possess good thermal stability, a low coefficient of thermal expansion, good adhesion to various substrates, low water absorption and a high glass transition temperature.

Few organic dielectric materials have all of the desired properties. For example, polyimides show excellent processability, thermal and adhesion properties, but have dielectric constants in the range of 3.5–3.6 (as compared to polystyrene which has a dielectric constant of 2.55). Furthermore, polyimides absorb water, a phenomenon which gives rise to even higher dielectric constants when polyimides are stored under conditions of high relative humidity. As the dielectric constant increases, the density at which elements can be packed on a chip decreases. For the past two decades, the trend has been toward increasing density of discrete devices as the size of the devices shrinks. Consequently, polymeric alternatives to polyimides with lower dielectric constants are being sought.

Colvin and Muse (Chemtech 1986, 500–504) have disclosed the cationic polymerization of 1,4-diisopropenylbenzene using a proprietary catalyst. The products of the polymerization using the undisclosed catalyst were stated to have a high glass transition temperature ($T_g$) and good thermal stability. However, 1,4-diisopropenylbenzene is a solid and cannot be directly spun onto a silicon wafer or photopolymerized without the use of a solvent.

D'Onofrio [J Appl. Polym. Sci. 8, 521 (1964)] has also reported the cationic polymerization of 1,4-diisopropenylbenzene, but Colvin and Muse indicate that the resulting polymer had a low softening point and contained a large amount of HCl which was slowly released on standing.

In contrast to 1,4-diisopropenylbenzene, 1,3-diisopropenylbenzene is a free-flowing, colorless, mobile liquid with a high boiling point (231° C.). If it could be efficiently polymerized and if the product were a low dielectric, thermally and dimensionally stable polymer, a most useful process would be provided.

Lutz et al. [Makromol. Chem. 183, 2787–2797 (1982)] reported that when 1,3-diisopropenylbenzene was polymerized with an anionic organometallic initiator, the reaction led initially to a polymer that appears to be predominantly a polypropylene with pendant isopropenyl phenyl residues:

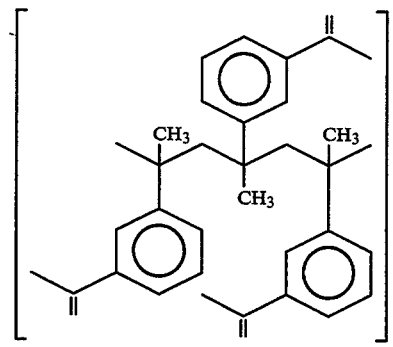

The polymer depolymerizes at slightly above room temperature to revert to the monomer. When allowed to stand at −30° C. the linear polypropylene begins to crosslink, but no polymer that is stable at room temperature is described. p The use of 1,3-diisopropenylbenzene as a comonomer in cationic polymerizations is known ("see European published applications 449,453 and 466,305). There is an early reference to the cationic polymerization of "diisopropenylbenzenes" and an implication that 1,3-diisopropenylbenzene forms polymers that contain indane structures. [Brunner et al. J Polym. Sci 28, 629–631 (1958)]. The polymers are said to be soluble in a wide range of solvents. U.S. Pat. No. 5,079,378 (Crivello) suggests a long list of possible monomers that might be polymerized by the process of the patent, but, although 1,3-diisopropenylbenzene is listed, there is no indication that such a reaction was actually tried and no characterization of either the product of such a reaction or of its particularly and unexpectedly useful properties.

SUMMARY OF THE INVENTION

It is an object of the present invention to provide a thermally stable, low dielectric constant coating. It is a further object to provide a coating that has a high glass transition temperature.

It is a further object to provide a coating whose coefficient of thermal expansion is similar to that of crystalline silicon.

It is a further object to provide a composition that can be spin-coated onto a substrate and can be cured to provide a coating having the advantages enumerated above.

It is a further object to provide a composition and a process that minimize both energy requirements and the release of solvent vapors during curing.

These and other objects, features and advantages are provided by the present invention. In one aspect, the invention relates to a polymer produced by the cationic polymerization of 1,3-diisopropenylbenzene. The polymer is characterized by having a dielectric constant less than 3.0 and a glass transition temperature greater than 300° C. and further characterized in that the polymer is stable to thermal decomposition to 400° C. under nitrogen. The polymer is essentially insoluble in aliphatic hydrocarbon solvents.

The product of this process is believed to be a poly(m-indane) comprising from 80 to 100% of subunits of formula:

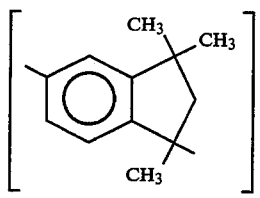

In another aspect, the invention relates to a composition for coating comprising a mixture of
(a) from 0 to 25 parts by weight of a poly(indane);
(b) from 75 to 150 parts by weight of 1,3-diisopropenylbenzene; and
(c) from 0.05 to 5.0 mole percent, based on 1,3-diisopropenylbenzene, of a cationic polymerization initiator.

A preferred polymerization initiator is a cationic photopolymerization initiator, preferably a (4-alkyloxyphenyl)phenyliodonium salt, most preferably (4-octyloxyphenyl)phenyliodonium hexafluoroantimonate.

One preferred composition comprises from 10 to 15 parts of poly(m-indane), 85 parts of 1,3-diisopropenylbenzene and 0.5 mole percent of (4-octyloxyphenyl)phenyliodonium hexafluoroantimonate.

A second preferred composition consists essentially of 1,3-diisopropenylbenzene and a cationic polymerization initiator.

In yet another aspect the invention relates to a process for coating a substrate comprising:
(a) applying a composition as described above to a substrate; and
(b) polymerizing the mixture to provide a coating having a glass transition temperature greater than 300° C.

Preferably the polymerization initiator is a cationic photoinitiator and the polymerization is carried out by exposing the mixture to actinic radiation. In one preferred process the mixture is applied by spin coating; in another, the mixture is applied by syringe.

DETAILED DESCRIPTION OF THE INVENTION

Photopolymerizations have many advantages for applying dielectric materials in the process of integrated circuit fabrication. A liquid photopolymerizable monomer can be conveniently spun onto silicon wafers at various stages of integrated circuit fabrication and used to planarize the surface over any existing topography. Additionally, for electrical insulation and isolation of the substrate from environmental contamination, a liquid photopolymerizable monomer can be applied simply as a droplet or puddle; this is commonly called a "glob top encapsulation". If a cationic photopolymerization can be provided that is very rapid, coatings can be produced quickly by irradiating the wafer in-line for a few seconds using UV light. Since solvents are often not required in the photopolymerization, such processes are essentially pollution-free. Lastly, if desired, the photosensitive monomer can be patterned by an imagewise exposure using a mask.

It has now been found that cationic photopolymerization of 1,3-diisopropenylbenzene can be carried out under specific conditions to give hard, transparent films. The polymerization appears to proceed by condensation followed by intramolecular ring-closure to yield indane structures along the polymer backbone as shown in Scheme A:

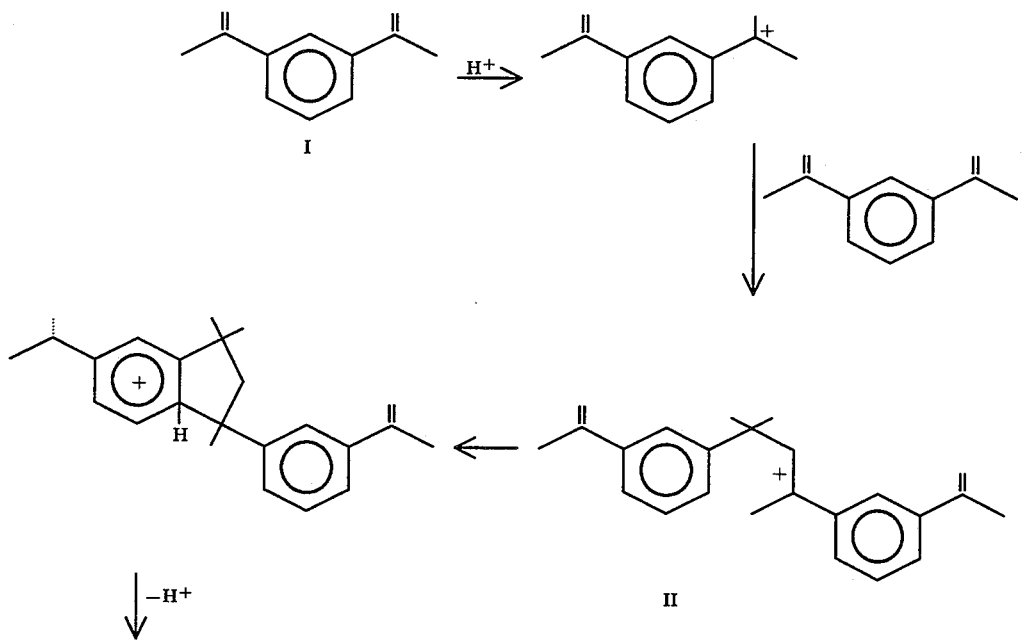

-continued
Scheme A

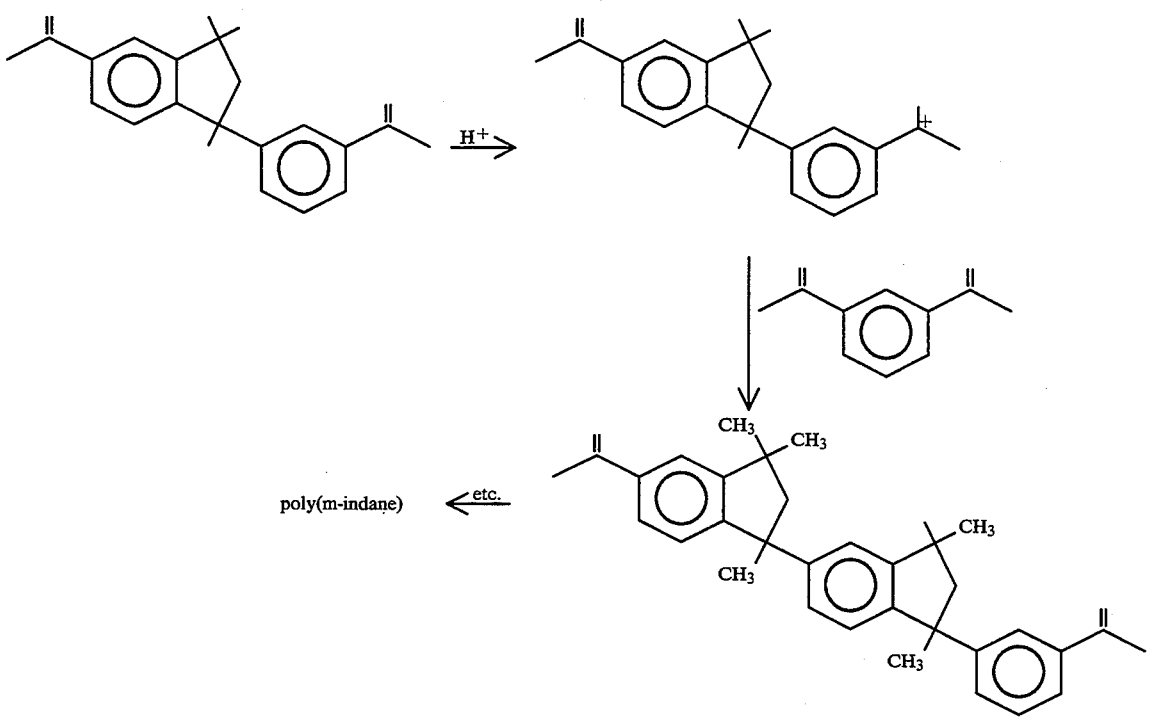

Initial attempts to photopolymerize 1,3-diisopropenylbenzene with conventional photoinitiators resulted in no polymerization whatsoever. Surprisingly, it was found that when a certain class of modified photoinitiators (shown below) were used, very rapid, exothermic polymerization resulted.

The cationic photoinitiators that were found to be effective in the process of the invention are of the general formulae:

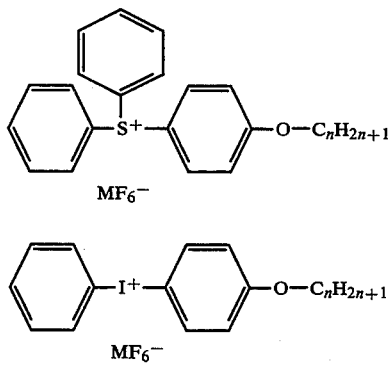

In the above formulae, n represents an integer from 8 to 22 and $MF_6^-$ is $PF_6^-$ $SbF_6^-$ or $AsF_6^-$. The syntheses of these modified onium salts are described in U.S. Pat. Nos. 4,882,201 and 5,079,378 and in Akhtar et Chem. of Materials 2 732–737 (1990) which are incorporated herein by reference. Although various members of the series of onium salts indicated above may be used in the practice of this invention, those bearing the $SbF_6^-$ anion are preferred because of their outstanding reactivity and better solubility characteristics in 1,3-diisopropenylbenzene.

Irradiation of substrates treated in accordance with the practice of the invention can be achieved by the use of UV lamps such as mercury arc lamps (high, medium and low pressure), xenon arc lamps, high intensity halogen-tungsten arc lamps, microwave driven arc lamps and lasers. Additional types of irradiation which can be used are, for example, ionizing irradiation (using $^{60}Co$ γ-rays) and electron beam irradiation.

A preliminary study of the cationic photopolymerization of 1,3-diisopropenylbenzene using 0.5 mole % of (4-octyloxyphenyl)phenyliodonium hexafluoroantimonate as the photoinitiator indicated that photopolymerization proceeds rapidly and exothermically. As indicated by the sharpness of a differential scanning photocalorimetry curve, the monomer is very reactive, and polymerization is essentially complete after approximately 30 seconds irradiation. When films of 1,3-diisopropenylbenzene and initiator were drawn onto glass plates and irradiated using a 200 W medium pressure mercury arc lamp, dry, tack-free films were obtained within 20 seconds irradiation. The clear, hard, colorless coatings are useful as coatings, adhesives and electronic encapsulants. The overall photopolymerization is believed to proceed as was shown in Scheme A to give predominantly poly(mindane), more properly named poly[1,6(1,3,3-trimethyl)indanyl].

The polymers are probably not 100% linear polyindane because the rigidity of the growing polymer is likely to prevent some of the isoprenes from having access to a reactive site for cyclization. As a result, a minor portion of the subunits will have structures that are derived from 1,3-diisopropenylbenzene that has not cyclized to indane. This can arise from loss of a proton from intermediate II or from condensation of the intermediate II with a molecule of 1,3-diisopropenylbenzene to give a polypropylene chain at that point. This will give rise to a possibility for branching.

The UV curable compositions of the present invention can be made by merely combining the arylonium salt with 1,3-diisopropenylbenzene or a mixture of 1,3-diisopropenylbenzene and a poly(indane), as discussed below. An effective amount of the arylonium salt is from about 0.01% to 20% by weight. Substrates which can be coated in accordance with the practice of the present invention are for example, plastic substrates such as polystyrene, polyethylene, polypropylene, polyimide, polycarbonate, polyvinylchloride, polysulfone, polyethylene and terephthalate; metal and semiconductor substrates such as silicon, germanium, gallium arsenide, aluminum, iron, steel, copper, brass, titanium, tungsten, gold, platinum, nickel and chromium; and glass and glass-epoxy composites. Application of the UV curable coating composition onto a substrate can be achieved by: roll coating, curtain coating, screen printing, gravure coating, dip coating, knife coating and offset printing. The thickness of such resins may range from a few tenths of a mil to 2 cm depending on the application and the conditions of photopolymerization.

UV curable compositions that contain 1,3-diisopropenylbenzene and a photoinitiator can be applied to substrates such as semiconductor devices and can be irradiated to encapsulate the device in a durable, insulating coating that isolates the component and protects from environmental contamination. For particular applications the compositions may contain additives and modifiers such as adhesion, wetting, flatting and flow-control agents, pigments, dyes and fillers. Suitable fillers include, for example, silica, ground $\alpha$ quartz and hydrated alumina.

Although generally UV light will be used in the practice of this invention, the above mentioned compositions may also be cured using visible light in the presence of suitable photosensitizers. The nature of the photosensitizer depends on the type of photoinitiator. For example, photosensitizers such as anthracene, naphthalene, perylene, pyrene, and phenothiazine can be used for triarylsulfonium salts, while the same compounds and, in addition, acridine orange, benzoflavin, phosphine R, 1-ethyl-9-ethoxyanthracene, 2-isopropylthioxanthone and many others may be used with diaryliodonium salts.

The polymerization compositions of pure 1,3-diisopropenylbenzene are not directly useful as spinon, low-dielectric-constant coatings. When the pure solutions of monomer and photoinitiator were spun onto either bare silicon wafers or aluminum coated wafers, very poor coatings resulted. It was determined that the problem was due to the very low viscosity of the solutions and their lack of the required viscoelastic properties for good spreading and film-forming. In an effort to circumvent these problems, a small amount of a film-forming polymer was incorporated into the spin coating solution. In addition to good film forming characteristics, the polymer to be incorporated must itself have good thermal and dielectric properties. In addition, the polymer must not possess functional groups which interfere with the cationic photopolymerization of the monomer. Several candidate polymers were contemplated and prepared. The best material for this purpose was found to be linear, low molecular weight poly(m-indane) (Mw=19,170 g/mol) prepared by the slow cationic photopolymerization of 1,3-diisopropenylbenzene. A solution of the monomer containing 13% by weight of poly(m-indane) and 0.5 mole % of the diaryliodonium salt photoinitiator (based on 1,3-diisopropenylbenzene) was found to have good spin coating characteristics. Other polyindanes arising from the polymerization of 1,4-diisopropenylbenzene and other diisopropenyl polynuclear aromatics should also function as polyindane components in the composition for spin coating.

To determine the best irradiation conditions for the photopolymerization, a film of the above solution was applied to a NaCl plate and the sample irradiated using a 200 W medium pressure mercury arc lamp. Infrared spectra showed the rapid disappearance of double bond absorptions at 1600 cm$^{-1}$ and 3100 cm$^{-1}$.

The above photopolymerizable solution was then spin coated onto vapor deposited aluminum coated silicon wafers and photopolymerization of the monomer-polymer mixture was initiated by the irradiation of the wafers for 30 seconds using a 200 W medium pressure mercury arc lamp. The thickness of the photopolymerized coating was 2.2 $\mu$m. It is especially notable, that although the photoinitiator an ionic material and might be expected to have a considerable elevating effect on the dielectric constant, apparently little effect is observed. The magnitude of the dielectric constant of poly(m-indane) is quite low.

Polystyrene is an analogous aromatic hydrocarbon polymer with a dielectric constant of 2.55 that has been used for dielectric applications. However, polystyrene is limited by both its low glass transition temperature ($T_g=90°$ C.) and its tendency to thermally decompose at approximately 300° C. In contrast, no glass transition temperature for the poly(m-indane) produced by cationic photopolymerization was recorded below 350° C. This suggests that, due to the rigidity of the chain backbone and to some crosslinking, the $T_g$ may be absent or may lie near the thermal decomposition temperature. The thermal stability of the photopolymerized poly(m-indane) was measured using thermogravimetric analysis (TGA) under nitrogen at a heating rate of 40° C./min. The TGA curve showed that this material has stability to approximately 450° C., which is adequate for most downstream wafer processing requirements, including wave soldering.

Another property of critical importance for a dielectric material in integrated circuit fabrication is its coefficient of thermal expansion. Using a Perkin Elmer TMA-7, the coefficient of thermal expansion (CTE) was measured in the range of 25° to 250° C. and found to be $20 \times 10^{-6}$ ppm/°C. For comparison, the CTE for polyimides is generally in the range $50 \times 10^{-6}$ ppm/°C. The low CTE measured for the spin-on photopolymerized poly(m-indane) is a highly desirable characteristic and comes closer than many other organic polymers to matching the CTE values for other integrated circuit materials such as silicon, molybdenum, aluminum and copper (CTE $3\text{-}30 \times 10^{-6}$ ppm/°C.).

Synthesis of Poly[1,6 (1,3,3-trimethylindanyl)] or [Poly(m-indane)]

1,3-Diisopropenylbenzene was polymerized in dichloromethane using 1 mole % TiCl$_4$ at 78° C. for 8 hrs (yield, 13%). Polymerization was also carried out by allowing the a solution of the monomer containing 1 mole% of the photoinitiator, (4-octyloxphenyl)phenyl iodonium hexafluoroantimonate, in a vial in laboratory light at room temperature for 72 hrs. The viscous polymerization mixture was diluted with chloroform and then precipitated into methanol. After filtering and drying the resulting solid white polymer, poly(m-indane) was obtained 95% yield; the weight average molecular weight (Mw) was 19,170 g/mol, and the ratio of the weight average molecular weight to the number average molecular weight, which is a measure of the dispersity (Mw/Mn), was 4.04.

Other initiators were also tried as 2 mole % solutions or mixtures. Triphenylsulfonium hexafluoroantimonate, diphenyliodonium hexafluoroantimonate, diphenyliodonium hexafluorophosphate, diphenyliodonium hexafluoroarsenate, and (4-methoxyphenyl)phenyl iodonium hexafluoroantimonate do not effectively catalyze the polymerization; diphenyl (4-thiophenoxyphenyl)-sulfonium hexafluoroantimonate was marginally effective; the hexafluoroantimonate salts of (4-alkyloxyphenyl)phenyliodonium were effective catalysts when alkyloxy was octyloxy, decyloxy, and pentadecyloxy; the corresponding diphenyl (4-alkyloxyphenyl) sulfonium salts were also effective.

A mixture containing 0.15 g of poly(m-indane), 1 g of 1,3- diisopropenylbenzene and 0.02 g (0.5 mol % based on 1,3-diisopropenylbenzene) of (4-octyloxyphenyl)-phenyliodonium hexafluoroantimonate was spin coated onto 4 inch aluminum metal vapor deposited silicon wafers. Clear, uniform, smooth coatings were obtained using a Solitec 1110 wafer spinner operating at 2100 rpm for 10 sec. The coatings were applied and photopolymerized in a class 100 clean room to avoid contamination.

Photopolymerization was carried out by irradiating the coated wafers for 30 seconds at a distance of approximately 6 inches from a General Electric H-3T7 200 W medium pressure Hg arc lamp. After irradiation, the coatings were completely dry and could be further handled for dielectric measurement. After photopolymerization, the polymer was insoluble in all solvents tested; these included aliphatic hydrocarbons such as hexane and cyclohexane, aromatic hydrocarbons such as toluene, and polar aprotic solvents such as such as dimethylsulfoxide and N,N-dimethylacetamide. By insoluble it is meant that the solubility is less than 0.1 g in 100 g of solvent.

The thickness of the poly(m-indane) coating at various spots on the wafer was measured by first scratching through the coating and then measuring the step height using a Tencor Instruments, Alpha-Step 200. The thickness of the coating was also measured using a Rudolph Research Autoel II Ellipsometer and a Nanometrics Nano Spec/AFT. There was good agreement among all three measurements. The average thickness was 2.2 $\mu$m.

The aluminized silicon wafers, spin coated with the photopolymerized poly(m-indane), were covered with a contact mask having numerous circular holes 0.237998, 0.51562 and 1,008 cm in diameter. The wafers were placed in a Airco Temescal CV-8 vacuum chamber and aluminum metal vapor deposited by electronbean evaporation at $10^{-6}$ torr. In this manner, circular capacitors with three different diameters were fabricated. Capacitance measurements were carried out with the aid of a Hewlett-Packard, 4280 A 1 MHz C Meter/C-V Plotter. Contact was made to the back side of the wafer and via a surface probe to one of the aluminum contacts. The capacitances of 50 individual capacitors were measured using a 1 MHz AC signal and the results were averaged. From these capacitance data, the dielectric constant was calculated to be 2.6.

While the invention has been particularly shown and described with reference to preferred embodiments thereof, it will be understood by those skilled the art that other changes in form and details may be made therein without departing from the spirit and scope of the invention.

I claim:

1. A composition for coating comprising a mixture of:
   (a) from 10 to 25 parts by weight of a polyindane;
   (b) from 75 to 150 parts by weight of 1,3-diisopropenylbenzne; and
   (c) from 0.05 to 5.0 mole percent, based on said 1,3-diisopropenylbenzene, of a cationic photopolymerization initiator.

2. A composition according to claim 1 wherein said initiator is a (4-alkyloxyphenyl)phenyliodonium salt.

3. A composition according to claim 2 wherein said initiator is (4-octyloxyphenyl)phenyliodonium hexafluoroantimonate.

4. A composition according to claim 1 comprising from 10 to 15 parts of poly(m-indane), 85 parts of 1,3-diisopropenylbenzene and 0.5 mole percent of (4-octyloxyphenyl)phenyliodonium hexafluoroantimonate.

5. A process for coating a substrate comprising:
   (a) applying a composition according to claim 5, wherein the polyindance is poly(m-indane), to said substrate; and
   (b) polymerizing said mixture to provide a coating having a glass transition temperature greater than 300° C.

6. A process according to claim 5 wherein said step of applying said mixture is accomplished by spin coating.

7. A process according to claim 5 wherein said step of applying said mixture is accomplished by syringe application.

* * * * *